Dec. 8, 1925.
R. M. LOVEJOY
1,564,869
SHOCK ABSORBER CONNECTION
Filed June 5, 1922  2 Sheets-Sheet 1
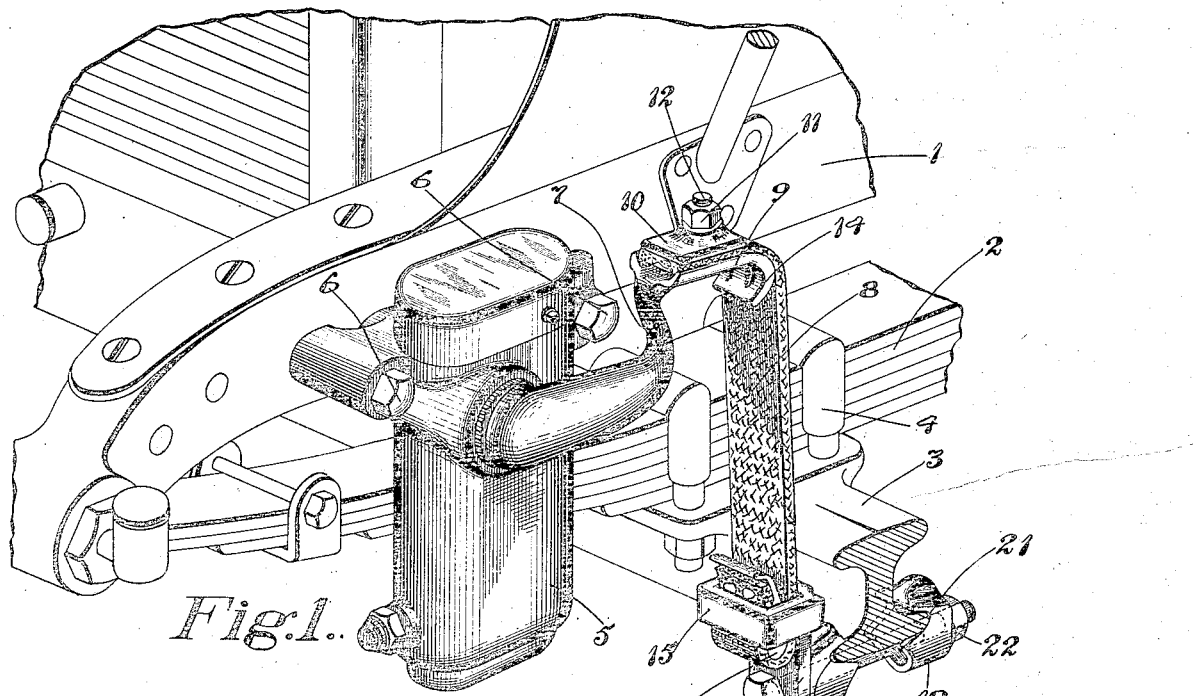
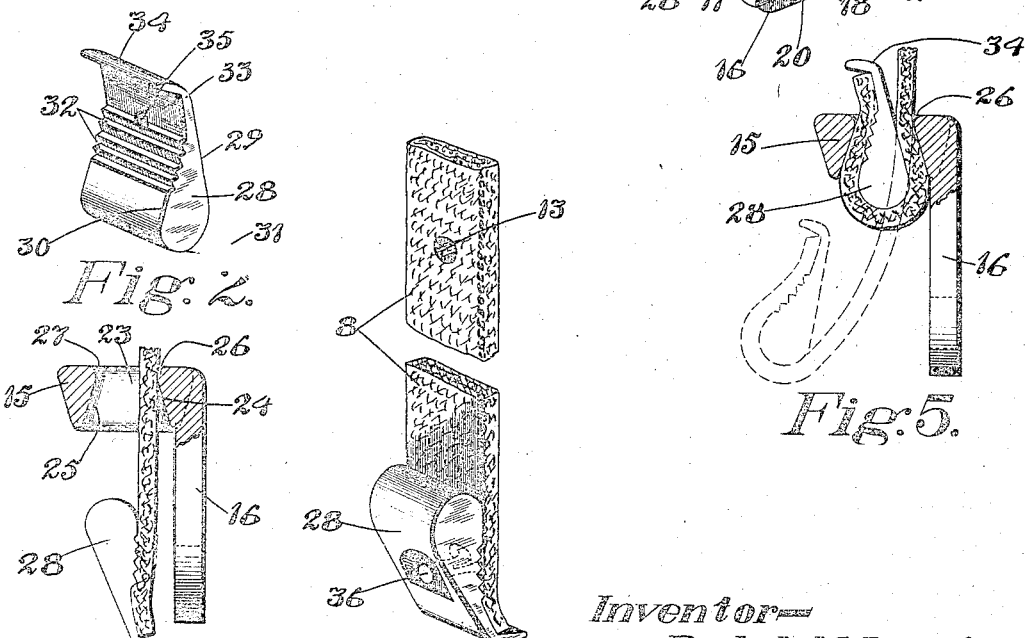
Inventor—
Ralph M. Lovejoy.
By Heard Smith & Tennant.
Attorneys.

Dec. 8, 1925.　　　　　　　　　　　　　　　　1,564,869
R. M. LOVEJOY
SHOCK ABSORBER CONNECTION
Filed June 5, 1922　　　　2 Sheets-Sheet 2

Inventor—
Ralph M. Lovejoy.
By—Heard Smith & Tennant
Attorneys.

Patented Dec. 8, 1925.

1,564,869

UNITED STATES PATENT OFFICE.

RALPH M. LOVEJOY, OF MEREDITH, NEW HAMPSHIRE.

SHOCK-ABSORBER CONNECTION.

Application filed June 5, 1922. Serial No. 565,884.

*To all whom it may concern:*

Be it known that I, RALPH M. LOVEJOY, a citizen of the United States, and resident of Meredith, county of Belknap, State of New Hampshire, have invented an Improvement in Shock-Absorber Connections, of which the following description, in connection with the accompanying drawing, is a specification, like characters on the drawing representing like parts.

The invention relates to improvements in flexible shock absorber connections and the object thereof is to provide a simple, inexpensive and effective means for anchoring the end of the flexible member which connects the shock absorber to the member which is movable relatively thereto.

A further object of the invention is to provide means by which the end of a flexible shock absorber connection can be readily secured to or removed from an anchoring device carried by the member which is movable relatively to the shock absorber.

A further object of the invention is to provide an anchoring device of this character which will not chafe the strap or abruptly bend the same by reason of relative movement of the shock absorber arm and the anchoring device.

A further object of the invention is to provide an anchoring device for a flexible shock absorber connection which can be assembled upon the axle or axle housing of a vehicle in proper relation to the position of the force-resisting member of the shock absorber.

In a broader aspect the invention comprises novel anchoring means for a flexible member to which a tension is applied.

Other objects and features of the invention will more fully appear from the following description and the accompanying drawings and will be pointed out in the claims.

A preferred embodiment of the invention is illustrated herein as applied to a shock absorber for cushioning the relative movement between the frame and axle of a vehicle, such as, an automobile, the shock absorber being of the general type disclosed in my prior Patent No. 1,324,913, granted December 16, 1919.

In the drawings:

Fig. 1 is a perspective view of the front end portion of the frame, spring and axle of a usual type of automobile, showing the shock absorber carried by the frame, the force-resisting arm of the shock absorber being connected to the axle by a strap which is anchored to the axle by mechanism embodying the present invention;

Fig. 2 is a perspective view of the locking wedge for the anchored end of the strap;

Fig. 3 is a perspective view showing the anchoring wedge secured to the end of the flexible connecting strap and also illustrating the hole punched in the opposite end portion of the strap;

Fig. 4 is a view partly in cross section illustrating the manner in which the end of the strap with its attached wedge is introduced into the aperture of the anchoring member;

Fig. 5 is a similar view showing in dotted lines the end of the strap being bent around the wedge to form a bight, and in full lines the position of the wedge-enclosing bight of the strap when introduced into the anchoring member;

Figure 6:
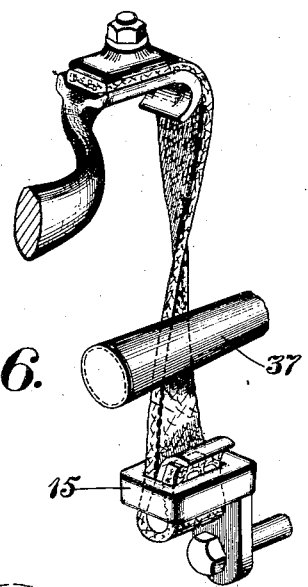
Fig. 6 is a perspective view showing the anchoring member so positioned that the flexible strap is given a quarter turn for the purpose of avoiding certain mechanism of the automobile, such as, the link of the steering mechanism.

The present invention is illustrated herein as applied to an automobile of a usual type which comprises a frame 1, the end of which is connected to a spring 2, the central portion of which is secured to the axle 3 of a vehicle by spring clips 4. A shock absorber 5 of the hydraulic type disclosed in my prior Patent No. 1,324,913 is shown herein as secured by bolts 6 to the frame of the automobile. The force-resisting arm 7 of the shock absorber is connected to the axle of the vehicle by a flexible member, preferably a strap 8. One end of the strap 8 is clamped upon a flat seat 9 upon the end of the force-resisting arm 7 by a clamping plate 10 which is forced against said strap by a nut 11 upon a stud 12 which is anchored at its lower end in the shock absorber arm and passes through a punched aperture 13 (see Fig. 3) in the end portion of the strap.

The shock absorber arm is provided with a downwardly curved end portion 14 which forms a guide for the strap and prevents such abrupt bending of the strap as will be likely to chafe or break the strap. The other end of the strap is connected to an anchoring device which in turn is secured, preferably detachably, to the mechanism of the vehicle which moves relatively to the shock absorber. This anchoring device may be secured to the relatively movable mechanism in numerous ways as is illustrated in the several figures of the drawings. For example, it may be connected directly to the axle, or to the axle housing for the rear axle, to the spring clip, or may form a part of the spring seat.

The present invention relates particularly to the anchoring mechanism and the means by which the strap is secured to the anchoring mechanism.

The anchoring mechanism broadly comprises a member, which is carried by the mechanism which is movable relatively to the shock absorber, having a converging aperture to receive a bight or loop of the flexible member with a bight-expanding member, preferably in the form of a wedge, located in said bight and adapted to enter the aperture and prevent the bight of the flexible member from being pulled through the aperture.

In the construction illustrated in Figs. 1 to 5 of the accompanying drawings the anchoring member is in the form of a bracket having a substantially rectangular strap-receiving portion 15 and a downwardly extending arm 16 which is connected by a bolt 17 and co-operating gripping members 18 and 19 to the axle 3 of the vehicle, the axle shown in Fig. 1 representing the usual front axle of an automobile. The gripping members 18 and 19 are of tubular form and are provided respectively with recesses 20 and 21 to engage the opposite flanges of the I-beam which forms the axle. The bolts 17 extend through the central portions of the tubular members 18 and 19 and a nut 22 serves to clamp the gripping members firmly upon the opposite flange of the I-beam and also to secure the arm 16 of the bracket firmly thereto.

The rectangular strap-receiving portion 15 of the bracket is provided with a central aperture 23 (see Fig. 4) of sufficient width to permit the strap and the anchoring wedge which is attached to it to be introduced. The aperture 23 has upwardly converging side walls 24 and 25, the upper edges 26 and 27 of the aperture preferably being rounded so that the strap will not be bent abruptly by lateral movements imparted to it during the oscillation of the shock absorber arm.

The strap after being introduced into the aperture 23 of the anchoring device is bent to form a bight or loop which is drawn upwardly into the aperture, a preferably wedge-shaped locking member being introduced into the bight before it is drawn into the aperture.

A preferred form of wedge-shaped locking member 28 is illustrated herein in Fig. 2 having converging faces 29 and 30 and a rounded back 31. The face 30 desirably is provided with a series of ribs or corrugations 32 adapted to engage and be embedded in the strap to prevent slipping of the strap thereupon. The edge 33 of the wedge-shaped locking member desirably is provided with a curved flange 34 over which the strap may be flexed without producing an abrupt bend in the strap.

The thinner portion of the wedge-shaped locking member is provided with an aperture 35 to receive a preferably split rivet 36 by which it is attached to the strap. The wedge preferably has a recess, the bottom of which is parallel to the ribbed face of the wedge and provides a seat for the head of the rivet 36, this recess being of sufficient size to permit the rivet to be applied by an automatic riveting machine.

The flanged edge portion of the wedge provides a convenient abutment for the end of the strap so that in assembling a wedge upon a strap which has been cut to the proper length the end of the strap may be abutted against the wedge and held in proper position while the rivet is forced through the aperture 35 in the wedge and through the strap and its split end clinched upon the strap.

In assembling the shock absorber connection the punched end of the strap is passed upwardly through the converging aperture in the anchoring member, as illustrated in Fig. 2. The end of the strap is then bent, as illustrated in dotted lines in Fig. 5, to form a loop the bight of which encloses the wedge, and the looped end of the strap then raised until the outer face of the strap engages the converging walls of the aperture in the anchoring member. The upper portion of the strap containing the aperture 13 is then carried over the strap-receiving seat and the stud 12 thrust through the aperture. Finally the clamping plate 10 is assembled upon the stud and clamped against the strap by the nut 11.

It will be noted that when tension is applied to the strap it will produce a tendency to rock the wedge so that the toothed or ribbed portion of the wedge will be forced firmly into one side of the end portion of the strap and the opposite side of this end portion of the strap will be forced firmly against the converging wall of the aperture. As the strap is retained under tension by the arm of the shock absorber the connection thus made is secure.

Where shock absorbers having an oscillating arm, such as that illustrated herein, are provided, the curved edge 26 of the wall 24 of the aperture in the anchoring member and the curved end portion 34 of the wedge-shaped anchoring member present surfaces over which the strap may be flexed without bending it abruptly; consequently, the danger of scoring or shearing the strap is avoided.

Various means may be employed for securing this form of anchoring member to the mechanism which is movable relatively to the force-resisting arm of the shock absorber.

In Fig. 6 the strap-receiving portion 15 of the bracket is illustrated as positioned in substantial parallelism with the longitudinal axis of the shock absorber arm in order to avoid the steering link 37 of the vehicle. Preferably the strap is twisted in the manner illustrated so that when the steering link advances as the wheels are turned it passes by the back edge of the strap and if it touches the strap at all it merely pushes against the surface. If the strap is twisted in a reverse direction the end of the steering link might hit the rear edge of the strap and thus be intercepted and cause a possible accident.

Figure 7:
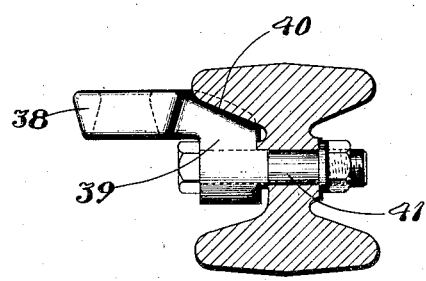
Fig. 7 illustrates a special type of anchoring bracket secured to the front axle of an automobile, the axle being shown in vertical section.

In Fig. 7 a different form of bracket is illustrated having a strap-receiving portion 38 corresponding to the strap-receiving portion 15 illustrated in the preceding figures. The arm 39 of this bracket is of different form and is provided with bosses 40 to engage the under face of the upper flange of the I-beam. In this construction the bolt 41, which connects the bracket to the axle, passes through the web of the axle.

Figure 8:
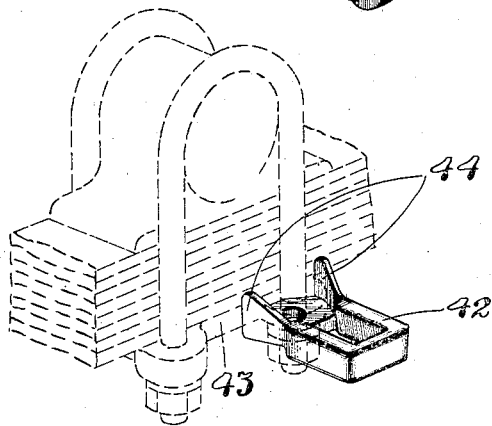
Fig. 8 is a perspective view of another form of bracket showing its connection to the rear axle of an automobile, the axle and spring being illustrated in dotted lines.

In the construction disclosed in Fig. 8 the strap-receiving portion 42 of the anchoring member is provided with an extension which is located beneath the spring chair and is clamped against the under face of the spring chair by one of the legs of the perch bolt by the usual nut upon the leg of the perch bolt. The anchoring member is provided with ears 44 adapted to engage the spring plate or the spring itself upon opposite sides of the legs of the perch bolt to which the anchoring member is attached and thereby prevent the anchoring member from turning about the axis of the perch bolt leg. This construction is particularly adapted for attachment to the rear axle of usual types of automobiles.

Figure 9:
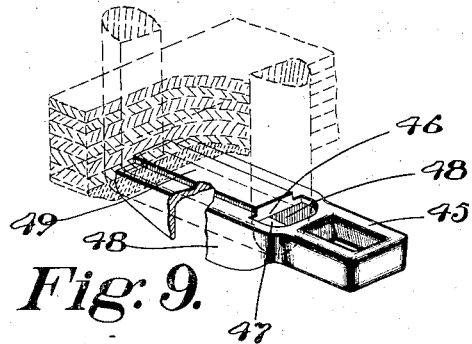
Fig. 9 is a perspective view of a modified form of bracket showing its application to a spring clip, portions of the spring clip and spring being shown in dotted lines; and, Fig. 10 is a perspective view of a different form of bracket showing its application to the rear axle of an automobile.

In the construction disclosed in Fig. 9 the strap-receiving portion 45 of the bracket is illustrated as forming an integral extension of a plate 46 which lies beneath the spring plate, the plate 46 being provided with an aperture 47 through which one of the legs of the spring clip passes. In this type of bracket the plate 46 desirably is provided with downwardly extending flanges 48 which serve to strengthen and reenforce the bracket against the upward strain of the strap-pull and also to form a socket for the base of the spring clip. The upper face of the plate 46 may be provided with a rib 49 to fit a corresponding recess in the spring seat employed in cars for which this bracket is adapted.

Figure 10:
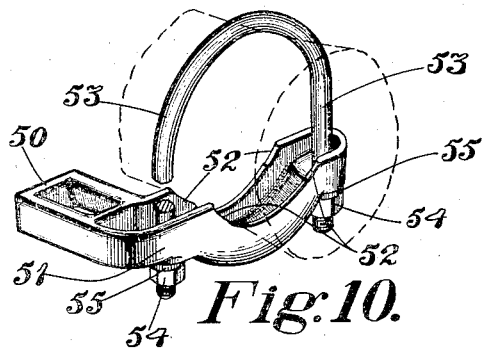

The construction illustrated in Fig. 10 is particularly designed to be secured directly to the rear axle housing of an automobile. In this construction the strap-receiving portion 50 of the bracket extends in substantial parallelism with the axle and the arm 51 of the bracket is of channel form curved to conform to the contour of the axle so that the portions 52 of the channel walls engage the under side of the axle. The web of the channel portion is provided with suitable apertures to receive the legs 53 of a U-shaped clip which embraces the axle. The bracket is secured to the axle by suitable clamping nuts 54 upon the ends of the legs of the axle, spring washers 55 desirably being interposed between the nuts and the under face of the web of the channel.

The foregoing forms of bracket are illustrative of some of the commercial forms which have been designed for various types of automobiles. It will, however, be understood that such other forms of anchoring member may be employed as may be required for other types of vehicles.

It will thus be seen that the anchoring connection for the strap may be so constructed as to be adapted either to the front or rear axle of the vehicle and may also be so constructed as to be adapted for different types of vehicles.

While the particular embodiment of the invention is disclosed herein as applied to the shock absorber connection for securing the force-resisting arm of the shock absorber to the axle or spring of the vehicle the anchoring mechanism may be employed in other mechanisms and in various other relations. Therefore, the particular embodiments of the invention disclosed herein are merely illustrative and not restrictive of the scope of the claims.

Having thus described my invention, what I claim as new, and desire to secure by Letters Patent, is:

1. A shock absorber connection for connecting an oscillating shock absorber arm to a relatively movable member of a vehicle comprising an anchoring member, connected to said relatively movable member, having an aperture presenting a pair of walls converging toward said arm, a strap connected at one end to said arm, a wedge-shaped member having faces complementary to the converging walls of said aperture and having one of its faces permanently secured to said strap with the edge of the wedge extending in the direction of the adjacent end of the strap, whereby the end of the strap, with the wedge thereto attached, will pass through the narrow end of said aperture, and when reversed, to bend said strap around the base of the wedge, and the wedge again entered into the aperture, will clamp said strap firmly against the converging walls of the aperture.

2. A shock absorber connection for connecting an oscillating shock absorber arm to a relatively movable member of a vehicle comprising an anchoring member, connected to said relatively movable member, having an aperture presenting a pair of walls converging toward said arm, a strap connected at one end to said arm, a wedge-shaped member having faces complementary to the converging walls of said aperture and having a serrated face permanently secured to said strap with the end of the wedge extending in the direction of the adjacent end of the strap, whereby the end of the strap, with the wedge thereto attached, will pass through the narrow end of said aperture, and when reversed, to bend said strap around the base of the wedge, and the wedge again entered into the aperture, said strap will be clamped firmly by the serrated face and the opposite face of the wedge against the converging walls of said aperture.

3. A shock absorber connection for connecting an oscillating shock absorber arm to a relatively movable member of a vehicle comprising an anchorong member, connected to said relatively movable member, having an aperture presenting a pair of walls converging toward said arm, a strap connected at one end to said arm, a wedge-shaped member having faces complementary to the converging walls of said aperture and having one of its faces permanently secured upon said strap with the edge of the wedge extending in the direction of the adjacent end of the strap and a strap-flexing end projecting beyond and over the end of said strap, whereby the end of the strap, with the wedge thereto attached, will pass through the narrow end of said aperture, and when reversed, to bend said strap around the base of the wedge, and the wedge again entered into the aperture, the strap-flexing extension will project beyond said anchoring member and will act to prevent abrupt bending of said strap by the oscillating movement of the shock absorber arm.

4. A strap-anchoring device comprising an anchoring member having an aperture presenting a pair of converging walls, a strap having a wedge-shaped member permanently connected thereto with the edge of said wedge extending toward the adjacent end of the strap, whereby the end of said strap, with the wedge thereto attached, may be passed through the narrow end of said aperture and then reversed to bend the strap about the base of the wedge and to enter the wedge and strap into the broader end of said aperture and thereby to clamp the strap firmly between the wedge and the converging walls of the aperture.

5. A strap-anchoring device comprising an anchoring member having an aperture presenting a pair of converging walls, a strap having a wedge-shaped member permanently connected thereto with the edge of said wedge extending toward the adjacent end of the strap, whereby the end of said strap, with the wedge thereto attached, may be passed through the narrow end of said aperture and then reversed to bend the strap about the base of the wedge and to enter the wedge and strap into the broader end of said aperture and thereby to clamp the strap firmly between the wedge and the converging walls of the aperture, said wedge having a strap-flexing extension to project beyond the narrow end portion of the aperture to prevent abrupt bending of the strap by reason of relatively lateral movement in one direction.

6. A strap-anchoring device comprising an anchoring member having an aperture presenting a pair of converging walls, a strap having a wedge-shaped member presenting a serrated face permanently connected to said strap permanently connected thereto with the edge of said wedge extending toward the adjacent end of the strap, whereby the end of said strap, with the wedge thereto attached, may be passed through the narrow end of said aperture and then reversed to bend the strap about the base of the wedge and to enter the wedge and strap into the broader end of said aperture and thereby to clamp the strap firmly between the wedge and the converging walls of the aperture.

In testimony whereof, I have signed my name to this specification.

RALPH M. LOVEJOY.